(12) United States Patent
Anderson, Jr. et al.

(10) Patent No.: US 7,124,425 B1
(45) Date of Patent: Oct. 17, 2006

(54) AUDIO/VIDEO SYSTEM AND METHOD UTILIZING A HEAD MOUNTED APPARATUS WITH NOISE ATTENUATION

(75) Inventors: Tazwell L. Anderson, Jr., Atlanta, GA (US); Mark A. Wood, Decatur, GA (US)

(73) Assignee: Immersion Entertainment, L.L.C., Norcross, GA (US)

( * ) Notice: Subject to any disclaimer, the term of this patent is extended or adjusted under 35 U.S.C. 154(b) by 0 days.

(21) Appl. No.: 09/386,613

(22) Filed: Aug. 31, 1999

Related U.S. Application Data

(63) Continuation-in-part of application No. 09/322,411, filed on May 28, 1999, now Pat. No. 6,578,203.

(60) Provisional application No. 60/137,323, filed on Jun. 3, 1999, provisional application No. 60/123,341, filed on Mar. 8, 1999.

(51) Int. Cl.
*H04N 7/20* (2006.01)

(52) U.S. Cl. ............................ 725/68; 725/64; 725/67; 725/73; 725/85; 348/157; 348/158; 359/630; 381/381

(58) Field of Classification Search ................ 345/8; 359/630–633; 725/141, 153, 133, 62–65, 725/68–71, 73, 85, 114; 381/370–372, 381; 348/143, 157–158, 584, 586–589, 825, 838
See application file for complete search history.

(56) References Cited

U.S. PATENT DOCUMENTS

| | | |
|---|---|---|
| 1,527,802 A | 2/1925 | Huggins |
| 1,648,832 A | 11/1927 | Urban |
| 2,603,724 A | 7/1952 | Kettler ..................... 179/182 |
| 2,856,469 A | 10/1958 | Morse ........................ 179/182 |
| 2,946,860 A | 7/1960 | Jansen et al. ................ 179/156 |
| 4,472,830 A | 9/1984 | Nagai ............................. 381/2 |
| 4,479,150 A | 10/1984 | Ilmer et al. .................. 358/310 |
| 4,486,897 A | 12/1984 | Nagai ............................. 381/2 |
| 4,504,861 A | 3/1985 | Dougherty .................. 358/143 |
| 4,572,323 A | 2/1986 | Randall ...................... 181/129 |
| 4,580,174 A | 4/1986 | Tokunaka .................... 358/328 |
| 4,605,950 A | 8/1986 | Goldberg et al. ............. 358/11 |
| 4,615,050 A | 10/1986 | Lonnstedt ...................... 2/209 |
| 4,620,068 A | 10/1986 | Wieder .................. 179/156 A |
| 4,727,585 A | 2/1988 | Flygstad ..................... 381/183 |
| 4,764,817 A | 8/1988 | Blazek et al. ............... 358/341 |
| 4,791,477 A | 12/1988 | Blazek et al. ............... 358/341 |
| 4,802,243 A | 2/1989 | Griffiths ........................... 2/6 |

(Continued)

OTHER PUBLICATIONS

Notification of Transmittal of International Preliminary Examination Report, Aug. 6, 2001.

(Continued)

*Primary Examiner*—Ngoc Vu
(74) *Attorney, Agent, or Firm*—Small Patent Law Group; Dean D. Small

(57) ABSTRACT

A head mounted display in a video/audio system includes a display device, a head mount, noise reduction devices, and a speaker. The display device is coupled to the head mount and produces visual images based on received video signals. The head mount is mounted on the user's head and is coupled to the noise reduction devices, which cover the user's ears such that external noise is reduced. The noise reduction devices are coupled together via a strap that fits around the user head. The noise reduction devices are coupled to and house speakers that produce sound signals based on received audio signals. As a result, the user may see the video images produced by the display device and clearly hear the sounds produced by the speaker, and the external noise heard by the user is reduced.

48 Claims, 8 Drawing Sheets

U.S. PATENT DOCUMENTS

| | | | |
|---|---|---|---|
| 4,809,079 A | 2/1989 | Blazek et al. | 358/335 |
| 4,830,138 A | 5/1989 | Palmaer et al. | 181/129 |
| 4,855,827 A | 8/1989 | Best | 358/143 |
| 4,856,089 A | 8/1989 | Horton | 455/351 |
| 4,856,118 A | 8/1989 | Sapiejewski | 2/209 |
| 4,864,425 A | 9/1989 | Blazek et al. | 358/335 |
| 4,866,515 A | 9/1989 | Tagawa et al. | 358/86 |
| 4,887,152 A | 12/1989 | Matsuzaki et al. | 358/86 |
| 4,944,361 A | 7/1990 | Lindgren et al. | 181/129 |
| 4,958,697 A | 9/1990 | Moody | 181/129 |
| 4,965,825 A | 10/1990 | Harvey et al. | 380/9 |
| 4,982,278 A | 1/1991 | Dahl et al. | 358/88 |
| 4,983,967 A | 1/1991 | McKenzie | 341/110 |
| 5,018,599 A | 5/1991 | Dohi et al. | 181/129 |
| 5,020,163 A | 6/1991 | Aileo et al. | 2/209 |
| 5,023,707 A | 6/1991 | Briggs | 358/343 |
| 5,023,955 A | 6/1991 | Murphy, II et al. | 2/209 |
| 5,046,192 A | 9/1991 | Ryder | 2/12 |
| 5,068,923 A | 12/1991 | Sjoqvist | 2/209 |
| 5,109,414 A | 4/1992 | Harvey et al. | 380/9 |
| 5,128,765 A | 7/1992 | Dingwall et al. | 358/182 |
| 5,133,081 A | 7/1992 | Mayo | |
| 5,138,440 A | 8/1992 | Radice | 358/13 |
| 5,138,722 A | 8/1992 | Urella et al. | 2/209 |
| 5,173,721 A | 12/1992 | Green | 351/53 |
| 5,179,736 A | 1/1993 | Scanlon | 2/209 |
| 5,185,807 A | 2/1993 | Bergin et al. | 381/183 |
| 5,252,069 A | 10/1993 | Lamb et al. | 434/35 |
| 5,289,272 A | 2/1994 | Rabowsky et al. | 348/8 |
| 5,289,288 A | 2/1994 | Silverman et al. | 358/335 |
| 5,321,416 A | 6/1994 | Bassett et al. | 345/8 |
| 5,359,463 A | 10/1994 | Shirochi et al. | 360/19.1 |
| 5,392,158 A | 2/1995 | Tosaki | |
| 5,414,544 A | 5/1995 | Aoyagi et al. | 359/53 |
| 5,420,381 A | 5/1995 | Gardner, Jr. et al. | 181/129 |
| 5,440,197 A | 8/1995 | Gleckman | 313/110 |
| 5,463,428 A | 10/1995 | Lipton et al. | 351/158 |
| 5,481,478 A | 1/1996 | Palmieri et al. | 364/514 R |
| 5,506,705 A | 4/1996 | Yamamoto et al. | 359/40 |
| 5,510,828 A | 4/1996 | Lutterbach | |
| 5,546,099 A | 8/1996 | Quint et al. | |
| 5,585,858 A | 12/1996 | Harper et al. | 348/485 |
| 5,594,551 A | 1/1997 | Monta | 386/92 |
| 5,600,365 A | 2/1997 | Kondo et al. | 348/8 |
| 5,617,331 A | 4/1997 | Wakai et al. | 364/514 A |
| 5,631,693 A | 5/1997 | Wunderlich et al. | 348/7 |
| 5,642,221 A | 6/1997 | Fischer et al. | 359/477 |
| 5,666,151 A | 9/1997 | Kondo et al. | 348/8 |
| 5,668,339 A | 9/1997 | Shin | 84/634 |
| 5,671,320 A | 9/1997 | Cookson et al. | 386/97 |
| 5,682,172 A | 10/1997 | Travers et al. | 345/8 |
| 5,696,521 A | 12/1997 | Robinson et al. | 345/8 |
| 5,712,950 A | 1/1998 | Cookson et al. | 386/97 |
| 5,719,588 A | 2/1998 | Johnson | 345/8 |
| 5,729,471 A | 3/1998 | Jain et al. | 364/514 |
| 5,742,263 A * | 4/1998 | Wang et al. | 345/8 |
| 5,742,521 A | 4/1998 | Ellenby et al. | 364/550 |
| 5,754,254 A | 5/1998 | Kobayashi et al. | 248/578 |
| 5,760,819 A | 6/1998 | Sklar et al. | 348/8 |
| 5,767,820 A | 6/1998 | Bassett et al. | 345/8 |
| 5,809,574 A | 9/1998 | Falco et al. | 2/209 |
| 5,812,224 A | 9/1998 | Maeda et al. | 349/13 |
| 5,815,126 A | 9/1998 | Fan et al. | 345/8 |
| 5,835,609 A | 11/1998 | LeGette et al. | 381/187 |
| 5,844,656 A | 12/1998 | Ronzani et al. | 351/158 |
| 5,867,223 A | 2/1999 | Schindler et al. | 348/552 |
| 5,880,773 A | 3/1999 | Suzuki | 348/115 |
| 5,887,286 A | 3/1999 | Waldron | 2/209 |
| 5,894,320 A | 4/1999 | Vancelette | 348/7 |
| 5,900,849 A | 5/1999 | Gallery | 345/8 |
| 5,903,395 A | 5/1999 | Rallison et al. | 359/630 |
| 5,946,635 A | 8/1999 | Dominguez | |
| 6,020,851 A * | 2/2000 | Busack | 342/457 |
| 6,035,349 A | 3/2000 | Ha et al. | |
| 6,060,995 A | 5/2000 | Wicks et al. | |
| 6,084,584 A | 7/2000 | Nahi et al. | |
| 6,166,734 A | 12/2000 | Nahi et al. | |
| 6,195,090 B1 | 2/2001 | Riggins, III | |
| 6,215,475 B1 | 4/2001 | Meyerson et al. | |
| 6,347,301 B1 | 2/2002 | Bearden, III et al. | |
| 6,351,252 B1 | 2/2002 | Atsumi et al. | |
| 6,356,905 B1 | 3/2002 | Gershman et al. | |
| 6,380,978 B1 | 4/2002 | Adams et al. | |
| 6,401,085 B1 | 6/2002 | Gershman et al. | |
| 6,526,580 B1 | 2/2003 | Shimomura et al. | |
| 6,532,152 B1 | 3/2003 | White et al. | |
| 6,549,229 B1 | 4/2003 | Kirby et al. | |
| 6,567,079 B1 | 5/2003 | Smailagic et al. | |
| 6,681,398 B1 * | 1/2004 | Verna | 725/141 |
| 2002/0057365 A1 | 5/2002 | Brown | |
| 2002/0090217 A1 | 7/2002 | Limor et al. | |
| 2002/0115454 A1 | 8/2002 | Hardacker | |
| 2002/0130967 A1 | 9/2002 | Sweetser | |
| 2002/0138587 A1 * | 9/2002 | Koehler et al. | 709/207 |
| 2003/0004793 A1 | 1/2003 | Feuer et al. | |
| 2003/0005052 A1 | 1/2003 | Feuer et al. | |
| 2003/0005437 A1 | 1/2003 | Feuer et al. | |
| 2003/0014275 A1 | 1/2003 | Bearden, III et al. | |
| 2003/0023974 A1 | 1/2003 | Dagtas et al. | |

OTHER PUBLICATIONS

PCT International Search Report dated Feb. 5, 2004; In re International Application No. PCT/US03/31696.

Written Opinion cited document in International Application No. PCT/US03/31696.

U.S. Appl. No. 60/071,119, filed Jan. 12, 1998, Verna.

U.S. Appl. No. 60/110,468, filed Nov. 30, 1998, Verna.

* cited by examiner

AUDIO/VIDEO SYSTEM AND METHOD UTILIZING A HEAD MOUNTED APPARATUS WITH NOISE ATTENUATION

CROSS REFERENCE TO RELATED APPLICATION

This document is a continuation-in-part of and claims priority to copending non-provisional U.S. patent application entitled "Video/Audio System and Method Enabling a User to Select Different Views and Sounds Associated with an Event," assigned Ser. No. 09/322,411, and filed May 28, 1999 now U.S. Pat. No. 6,578,203, which is incorporated herein by reference. This document also claims priority to and the benefit of the filing date of the following copending U.S. provisional applications: (1) "Audio/Video Signal Distribution System for Head Mounted Displays," assigned Ser. No. 60/123,341, and filed Mar. 8, 1999, which is hereby incorporated by reference; and (2) "Head Mounted Display with Sound Isolation/Hearing Protector Ear Cup," assigned Ser. No. 60/137,323, and filed Jun. 3, 1999, which is incorporated herein by reference.

BACKGROUND OF THE INVENTION

1. Field of the Invention

The present invention generally relates to video and audio signal processing techniques and, in particular, to a system and method for receiving video and audio signals from a plurality of sources and for providing a user with multiple combinations of these signals to select from.

2. Related Art

Audio and video signals are generated from a plurality of sources during many events. For example, at an auto race, television crews usually position cameras at various locations within view of a race track. These cameras generate video signals defining views of the race track from various perspectives. In addition, microphones positioned at various locations generate audio signals defining different sounds at the auto race. For example, microphones may be located close to the race track to receive sounds produced by the vehicles participating in the race, and microphones may be located close to television commentators to receive the comments of the commentators as they observe and comment on the race.

One of the video signals and one or more of the audio signals are usually selected and combined together at a television station to form a combined video/audio signal. This signal is then modulated and transmitted so that users having a television can receive the combined signal via the television. The television demodulates the combined signal and displays an image defined by the video signal on a display screen and reproduces the sounds defined by the audio signals via speakers. Therefore, the sights and sounds of the race can be viewed and heard via the television.

In addition, one or more of the audio signals, such as audio signals defining the comments of radio commentators, are usually selected and modulated at a radio station to form a radio signal. This radio signal is then transmitted as a wireless signal so that users having radios can receive the signal via a radio. The radio demodulates the signal and reproduces the sounds defined by the radio signal via speakers.

However, users viewing and/or hearing the sights and sounds of the race via televisions and/or radios are not usually given the opportunity to select which video and/or audio signals are modulated and transmitted to the television and/or radio. Therefore, the user is only able to receive the signals modulated and transmitted to the television and/or radio, even though the user may prefer to receive the other audio and/or video signals that are generated at the auto race.

Spectators who actually attend the auto race are usually given more options to view and/or hear the sights and/or sounds of the race from different perspectives. In this regard, a plurality of monitors are usually located at particular locations in the stadium. As used herein, "stadium" shall be defined to mean any non-movable structure having a large number (i.e., thousands) of seats, wherein an event occurs at (i.e., within a close proximity of) the seats such that spectators sitting in the seats can view the event. An "event" is any occurrence viewed by a spectator.

Each monitor within the stadium receives one of the aforementioned video signals and displays an image defined by the received video signal to many of the spectators. However, the monitor does not always display a desirable perspective with respect to each spectator in the stadium, and the monitor is often not located in an inconvenient location for many of the spectators. In this regard, many of the spectators often must leave their seats (or other locations) in the stadium and go to a location where the spectators, along with other spectators, can view the monitor displaying the desired perspective. The spectators viewing the monitor often do not have control over which image is displayed by the monitor.

Thus a heretofore unaddressed need exists in the industry for providing a system and method that enables a spectator to conveniently view an event from different perspectives.

SUMMARY OF THE INVENTION

The present invention overcomes the inadequacies and deficiencies of the prior art as discussed hereinbefore. Generally, the present invention provides a system and method for providing a user with a plurality of audio and video signals defining different views and sounds associated with an event while reducing the amount of external noise heard by the user.

The present invention includes a display device, a head mount, noise reduction devices, and a speaker. The display device is coupled to the head mount and produces visual images based on received video signals. The head mount is mounted on the user's head and is coupled to the noise reduction devices, which cover the user's ears such that external noise is reduced. The noise reduction devices are coupled together via a strap that fits around the user head. The noise reduction devices are coupled to and house speakers that produce sound signals based on received audio signals. As a result, the user may see the video images produced by the display device and the sounds produced by the speaker, and the external noise heard by the user is reduced.

In accordance with another feature of the present invention, the head mount has ridges formed thereon, and the noise reduction devices include notches. Once the noise reduction devices are properly positioned, the ridges are received by the notches, and the noise reduction device is, therefore, less likely to move with respect to the head mount.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

The preferred embodiment of the present invention will be described hereafter in the context of auto racing applications. However, the scope of the present invention should not be so limited, and it should be apparent to one skilled in the art that the principles of the present invention may be employed in the context of other applications, particularly in the context of other sporting events (e.g., football games, basketball games, baseball games, hockey matches, etc.).

Figure 1:
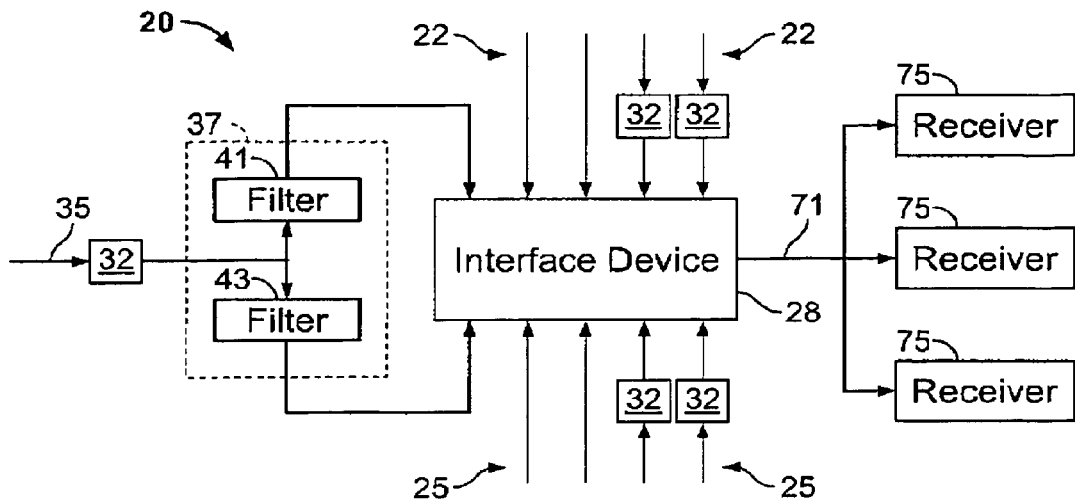
FIG. 1 is a block diagram illustrating a video/audio system in accordance with the present invention.

FIG. 1 depicts a video/audio system 20 implementing the principles of the present invention. At least one video signal 22 and at least one audio signal 25 are received by an interface device 28. Each of the received video signals 22 defines a view of the race from a different perspective. For example, the video signals 22 may be generated by different video cameras located at different locations around the stadium, including inside at least some of the vehicles participating in the race.

Furthermore, each of the audio signals 25 defines different sounds associated with the race. For example, at least one of the audio signals 25 may be generated from a microphone located close to the track or in one of the vehicles such that the audio signal 25 defines noise from the vehicles participating in the race. Alternatively, at least one of the audio signals 25 may define the comments of television commentators, and at least one of the audio signals 25 may define the comments of radio commentators. Furthermore, at least one of the audio signals may define the comments between one of the drivers participating in the race and the driver's pit crew.

Some of the video and audio signals 22 and 25 can be unmodulated when transmitted to the interface device 28 and, therefore, do not need to be demodulated by the system 20. However, some of the video and audio signals 22 and 25 may need to be demodulated by the system 20. For example, at least one of the audio signals 25 defining the comments of the radio commentators may be modulated as a radio signal for transmission to radios located at or away from the stadium, and at least one of the video signals 25 may be modulated as a television signal for transmission to televisions located at or away from the stadium. In addition, the comments between a driver and the driver's pit crew are usually transmitted via ultra high frequency (UHF) radio waves, which are known to be modulated signals. Therefore, as shown by FIG. 1, the system 20 preferably includes demodulators 32 configured to receive and demodulate the video and/or audio signals 22 and 25.

It is possible for some of the video and audio signals 22 and 25 to be received from a combined signal 35, which is comprised of at least one video signal 22 combined with at least one audio signal 25. For example, the combined signal 35 may be a television signal modulated for transmission to televisions located at or away from the track stadium. To facilitate the combination of different audio signals 25 with the video signal(s) 22 defined by the combined signal 35, a separator 37 preferably separates the combined signal 35 into its respective video signal 22 and audio signal 25, as shown by FIG. 1.

Various configurations of the separator 37 may exist without departing from the principles of the present invention. FIG. 1 depicts a possible implementation of the separator 37. In this regard, the separator 37 includes an audio signal filter 41 designed to filter out any audio signals 25 from the combined signal 35 and to transmit the resulting video signal(s) 22 to interface device 28. Furthermore, the separator 37 also includes a video signal filter 43 designed to filter out any video signals 22 from the combined signal 35 and to transmit the resulting audio signal(s) 25 to interface device 28. If more than one video signal 22 or more than one audio signal 25 is included in the combined signal 35, then the separator 37 may include additional filters (not shown) to separate the multiple video and/or audio signals 22 and 25 into individual signals before transmitting the signals 22 and 25 to the interface device 28.

Figure 2:
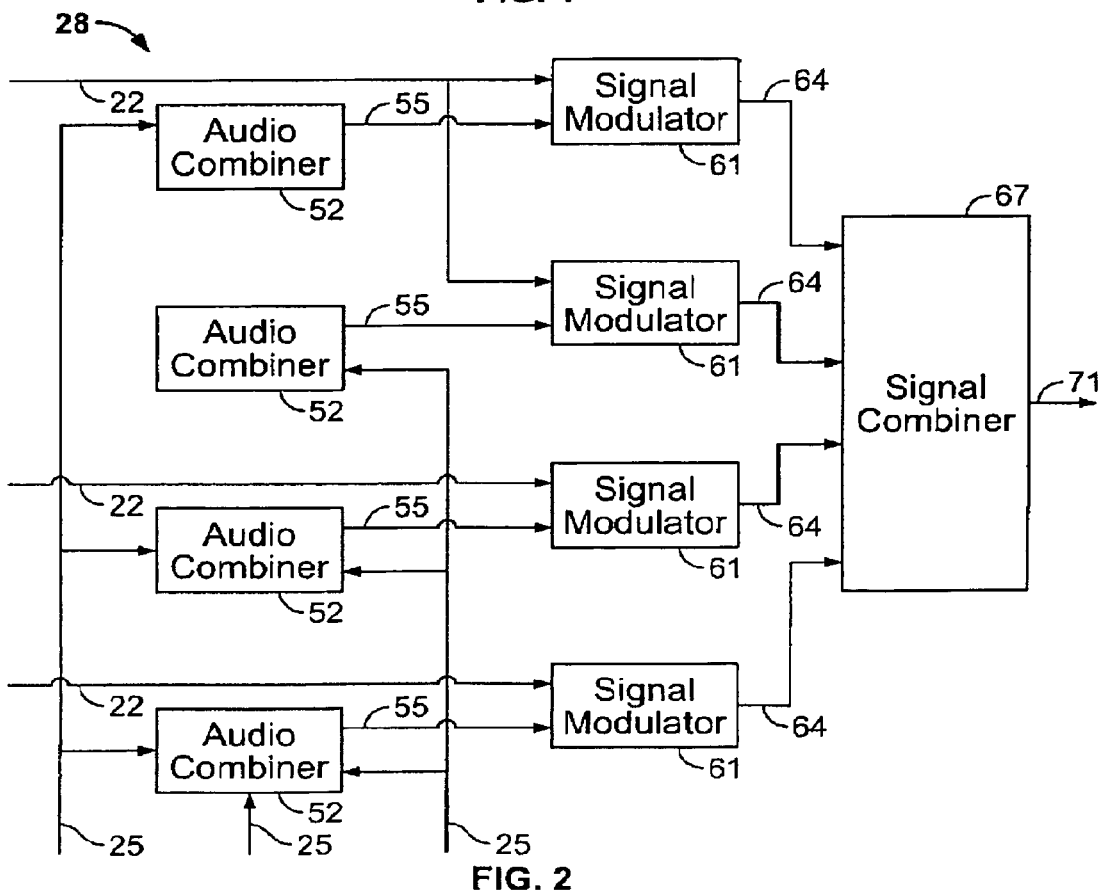
FIG. 2 is a block diagram illustrating a detailed view of an interface device depicted in FIG. 1.

FIG. 2 depicts a more detailed view of the interface device 28. The interface device 28 includes audio combiners 52 configured to receive audio signals 25 and to combine the received audio signals 25 into a single combined audio signal 55. As shown by FIG. 2, each audio combiner 52 preferably receives a different combination of audio signals 25, although it is possible for any one of the combined signals 55 to include the same combination of audio signals 25 as any other combined signal 55. Note that when an audio combiner 52 receives only one audio signal 25, the combined signal 55 output by the combiner 52 matches the one signal 25 received by the combiner 52.

As an example, one of the combined signals 55 may include an audio signal 25 defining comments between a driver and the driver's pit crew and also an audio signal 25 defining sounds (i.e., vehicular noises) received by a microphone located in the driver's vehicle. Another of the combined signals 55 may include the aforementioned audio signals 25 as well as an audio signal 25 defining a radio commentator's comments. Another combined signal 55 may only include an audio signal 25 defining a television commentator's comments. Accordingly, the combined signals 55 preferably define different combinations of sounds. It should be noted that combinations of audio signals 25 other than those described hereinabove are possible.

As shown by FIG. 2, each combined signal 55 is transmitted to a respective signal modulator 61. Each signal modulator 61 is also configured to receive a respective one of the video signals 25 received by the interface device 28. Each signal modulator 61 is configured to combine the received combined signal 55 and video signal 25 and to modulate the received signals 55 and 25 on a unique frequency range. The signal modulator 61 is then designed to transmit the modulated signal 64, which comprises the combined signal 55 and the video signal 25 received by the signal modulator 61, to a combiner 67. The combiner 67 is configured to combine each of the modulated signals 64 transmitted from each of the signal modulators 61 into a single combined (i.e., multiplexed) signal 71. This combined signal 71 is then transmitted to a plurality of receivers 75.

Various techniques exist for transmitting combined signal 71 to receivers 75. For example, a coaxial cable may be used to transmit the combined signal 71 to each of the receivers 75. In another example, the system 20 may include a wireless transmitter (not shown) that transmits the combined signal 71 to the receivers 75. Any technique for transmitting the combined signal 71 to the receivers 75 should be suitable for implementing the present invention.

Figure 3:
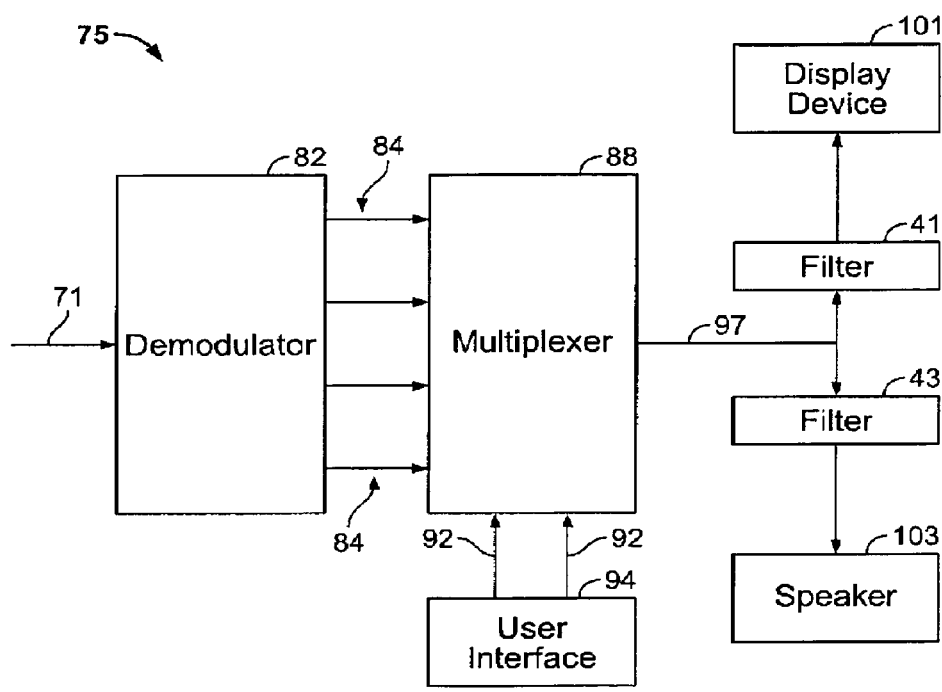
FIG. 3 is a block diagram illustrating a detailed view of a receiver depicted in FIG. 1.

A more detailed view of receiver 75 is shown by FIG. 3. Receiver 75 preferably includes a demodulator 82. The demodulator 82 is configured to demodulate the combined signal 71 and to separate (i.e., demultiplex) the combined signal 71 into signals 84 based on frequency, such that each signal 84 respectively corresponds with one of the modulated signals 64. In other words, the demodulator 82 recovers the individual signals 64 as signals 84, and each signal 84 is, therefore, defined by the same video and audio signals 22 and 25 that define its corresponding modulated signal 64. Therefore, like modulated signals 64, each signal 84 is preferably comprised of a unique combination of video and audio signals 22 and 25.

Signals 84 are transmitted from demodulator 82 to a multiplexer 88, which also receives control signals 92 from a user interface 94. The user interface 94 preferably includes buttons or other types of switches that enable a spectator to select one of the signals 84 via control signals 92. In this regard, the multiplexer 88, through techniques well known in the art, selects one of the signals 84 based on control signals 92 and outputs the selected signal 84 as output signal 97, as shown by FIG. 3. The receiver 75 includes an audio signal filter 41 configured to filter the audio signal(s) 25 out of signal 97. Therefore, only the video signal(s) 22 within signal 97 are transmitted to a display screen 101, which is configured to render the received video signal(s) 22 (i.e., display an image defined by the received video signal(s) 22) to the spectator.

The receiver 75 also includes a video signal filter 43 configured to filter the video signal(s) 22 out of signal 97. Therefore, only the audio signal(s) 25 within signal 97 are transmitted to a speaker 103, which is configured to produce sounds defined by the received audio signal(s) 25, through techniques well known in the art.

In the preferred embodiment, the display screen 101 and speaker 103 are included within a head mounted display (HMD), which is discussed in further detail hereinbelow. By utilizing head mounted displays, the spectator's experience may be enhanced. For example, when a head mounted display is used to show an in-car view from a camera located in a driver's car during an auto race, the spectator sees a similar view as the driver of the car. Because the head mounted display limits the spectator's peripheral view of the environment around him, the user naturally focuses on the view provided by the head mounted display. Therefore, the user may feel almost as if he were riding in the car along with the driver, thereby enhancing the spectator's experience. The head mounted display may similarly enhance a spectator's experience at other events, such as other sporting events, for example.

Furthermore, when the combined signal 71 is transmitted via a coaxial cable, the receiver 75 may be located at a spectator's stadium seat or other convenient location. When the combined signal 71 is transmitted via a wireless transmitter, the receiver 75 is portable, and a spectator may carry the receiver 75 with him and choose where he would like to view the images and hear the sounds produced by the receiver 75.

Accordingly, the spectator may remain in his seat (or other convenient location) and control, by manipulating buttons or other types of switches in the user interface 94, which combination of video and audio signals 22 and 25 are respectively transmitted to display screen 101 and speaker 103. Therefore, the system 20 gives the spectator more flexibility in how the spectator views the race and, as a result, makes the race a more enjoyable experience.

It should be noted that video signals 22 and audio signals 25 may be separately transmitted to receiver 75. For example, video signals 22 may be processed and transmitted to receiver 75 via interface device 28 or other type of device, and audio signals 25 may be transmitted to receiver 75 via another device. Through conventional techniques, the receiver 75 may then be configured to select the audio and video signals 25 and 22 to be transmitted to display device 101 and speaker 103.

Head Mounted Displays

Figure 4:
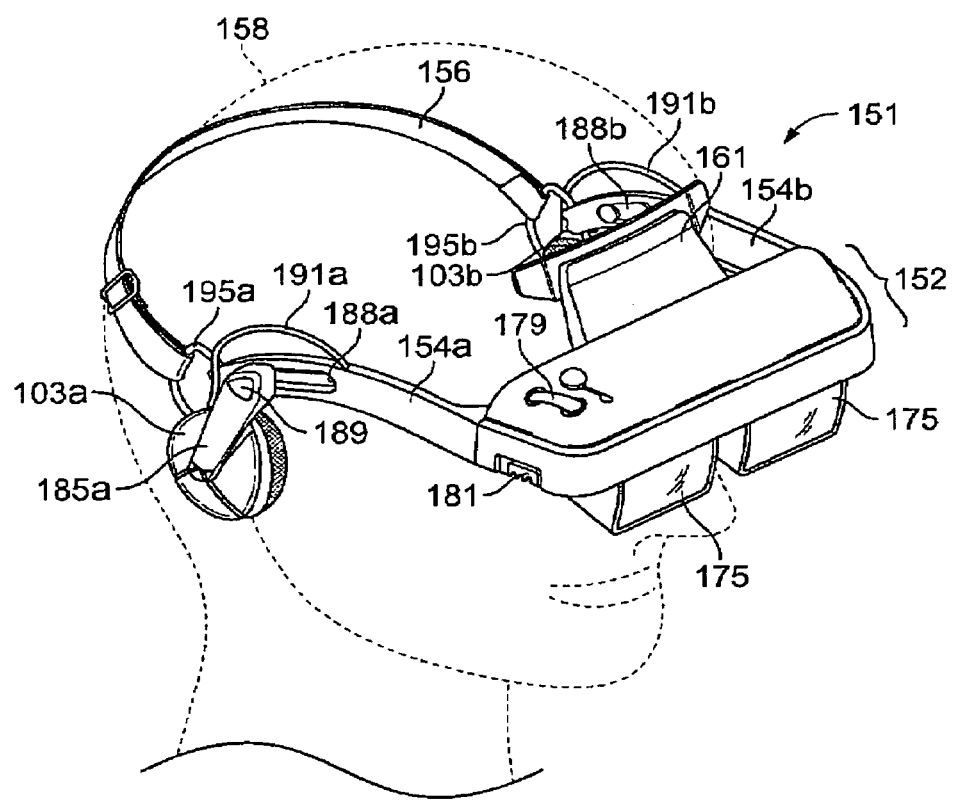
FIG. 4 is a three dimensional view of a conventional head mounted display.
Figure 5:
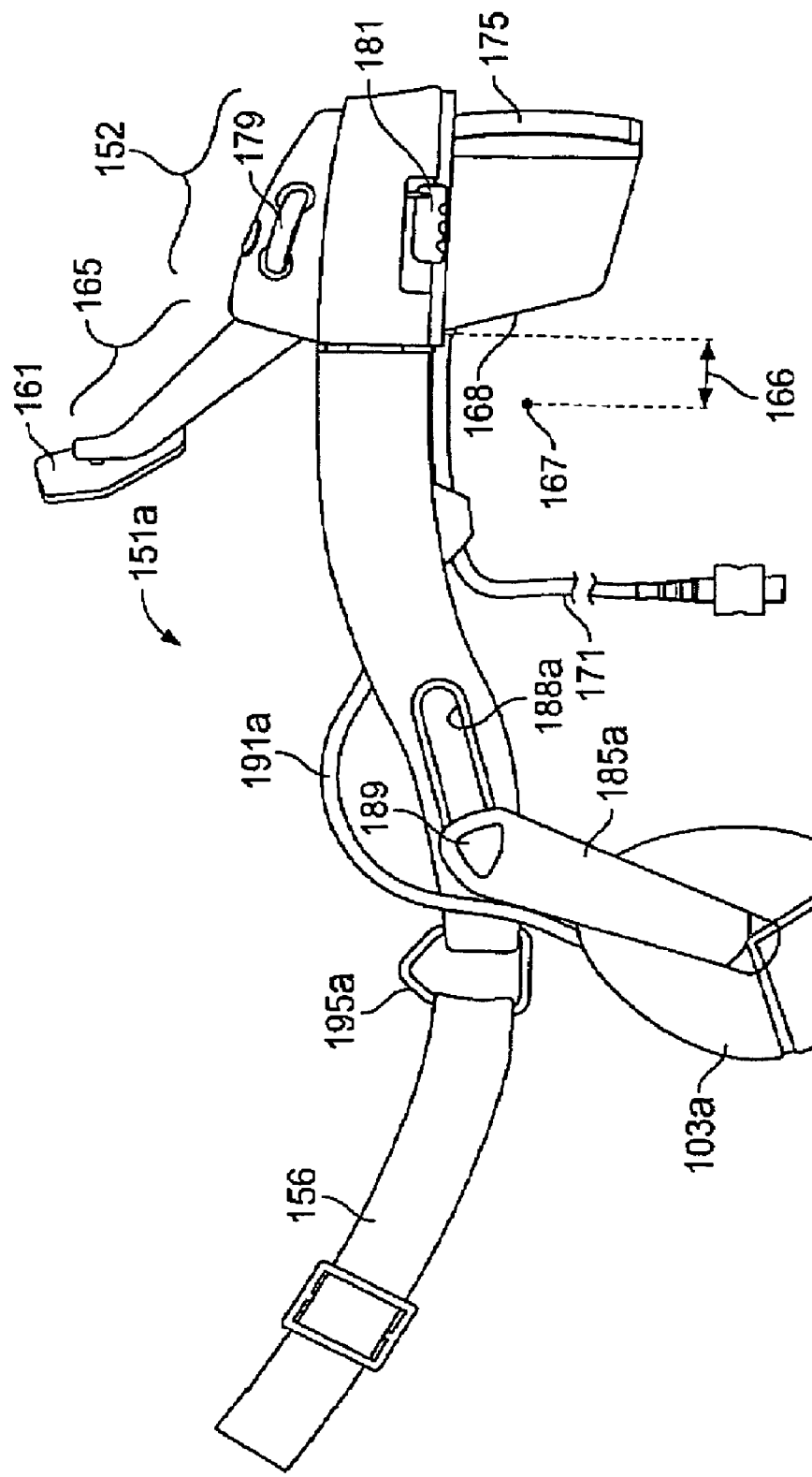
FIG. 5 is a side view illustrating the conventional head mounted display depicted in FIG. 4.

Many different types of head mounted displays may be employed to implement the present invention. Examples of head mounted displays that may be used to implement the present invention are fully described in U.S. Pat. No. 5,844,656, entitled "Head Mounted Display with Adjustment Components" and filed on Nov. 7, 1996, by Ronzani et al., and U.S. Pat. No. 5,903,395, entitled "Personal Visual Display System," and filed on Aug. 31, 1994, by Rallison et al., which are both incorporated herein by reference. FIGS. 4 and 5 depict a head mounted display (HMD) 151 described by U.S. Pat. No. 5,903,395.

As depicted in FIG. 4, the HMD 151 includes a main component 152, containing electronics or optics used to provide a visual display to the spectator. The HMD 151 also includes left and right temple pieces 154a and 154b that may be used for assisting and holding the main portion 152 in the desired position to deliver video output to the spectator's eyes. A strap 156 can be provided to further assist in holding the apparatus in the desired position with respect to the head 158 of the spectator. A forehead brace 161 can be provided to further assist in proper positioning of the main portion 152. The forehead brace 161 is useful to transfer some of the weight of the apparatus to the spectator's forehead. This may provide a more comfortable configuration than having substantially all of the weight transferred via other components such as the temple pieces 154a and 154b, headstrap 156 and/or a nose bridge piece (not shown) that may be used in other types of HMDs.

As can be seen in FIG. 5, the forehead brace 161 extends back a distance 165 from the main portion 152 of the apparatus. As a result, there is an amount of space 166 between the eye position 167 of the spectator and the portion 168 of the apparatus which resides in front of the spectator's eyes sufficient to accommodate the spectator's eyeglasses, e.g., about one inch or more (in one embodiment, about 25 mm).

A connection is provided for establishing communication or data transfer to the HMD 151 which, in the depicted embodiment, involves a cable 171 mounted along the underside of the left temple piece 154*b*. As an example, the demodulator 82 (FIG. 3), multiplexer 88, and user interface 94 may be included in a device separate from the HMD 151 shown by FIGS. 4 and 5. The cable 171 may transmit the signals 97 (FIG. 3) to the filters 41 and 43, which are located in the main portion 152. The filtered signals from filters 41 and 43 may be respectively transmitted to display device 101 (FIG. 3) and speaker 103 (FIG. 3) via other cables or other types of connections.

As can be seen by FIGS. 4 and 5, speakers 103*a* and 103*b* are respectively provided for each ear of the spectator. Furthermore, the display device 101 (FIG. 3) is comprised of two liquid crystal displays (LCDs) 175 that receive video signals and produce images based on the received video signals through techniques well known in the art. Each of the LCDs 175 is positioned in front of a respective eye of the spectator so that each eye of the spectator views an image produced by one of the LCDs 175.

In the depicted embodiment, a rocker switch 179 can be used to provide control of a parameter which varies through a range, such as the volume of the sound produced by the speakers 103*a* and 103*b*. Other items that could be controlled in this fashion include, but are not limited to, tint, hue or contrast of the video, selection of a video and/or audio source such as channel selection, image brightness, audio tone (i.e., treble/bass control) and the like. A slider switch 181 can be used, e.g., to select among discrete choices. For example, the slider switch 181 may be used to select left, right or no relative frame phasing, to select between stereo and non-stereoscopic views, etc. Other controls and/or indicators can also be used and can be mounted on various surfaces of the head-mounted apparatus of FIG. 4.

Left speaker 103*a* is movably attached to the end of the temple piece 154*a*, e.g., by pivotable arm 185*a* which can be laterally adjusted to a mounting slot 188*a* in temple piece 154*a*. The speaker 103*a* can be held in position by friction or a detent tightener 189 can be used to secure the speaker 103*a* in the desired position. Right speaker 103*b* is similarly secured to temple piece 154*b*. Cables 191*a* and 191*b* are respectively used in the HMD 151 of FIG. 4 to provide the desired signals to the speakers 103*a* and 103*b*, respectively. The head strap 156 is preferably coupled to the temple pieces 154*a* and 154*b* via left and right strap pivots, loops or D-rings 195*a* and 195*b*. A length and/or tightness adjustment mechanism such as a buckle, for example, can be provided on the strap 156.

Figure 6:
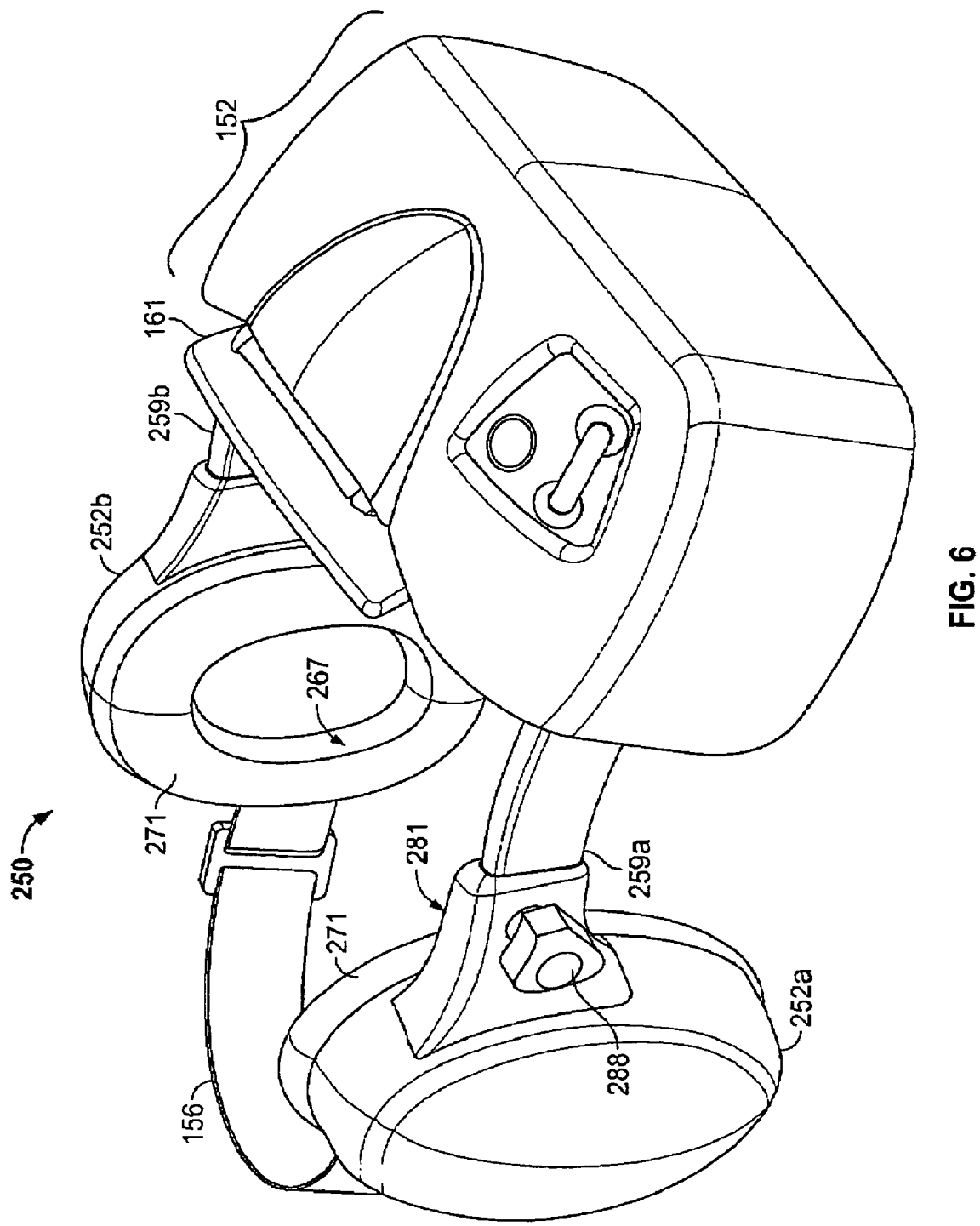
FIG. 6 is a three dimensional view of a head mounted display in accordance with the present invention.

At many sporting events (e.g., auto races, in particular), relatively loud noises are produced. Therefore, it would be difficult for a user to hear the selected audio signals via many conventional head mounted displays, such as the one depicted by FIGS. 4 and 5. Accordingly, the inventors have designed a HMD 250 that includes noise reduction devices 252*a* and 252*b* to reduce the amount of external noise heard by a spectator, as shown by FIG. 6.

Similar to HMD 151 of FIG. 4, HMD 250 includes temple pieces 259*a* and 259*b* that are connected to main portion 152. Main portion 152 and temple pieces 259*a* and 259*b* form a head mount to which other components of the HMD 151 can be coupled. Each noise reduction device 252*a* and 252*b* is similarly designed and is respectively coupled to the temple pieces 259*a* and 259*b* such that each device 252*a* and 252*b* fits over a respective ear of a spectator during use.

In this regard, each noise reduction device 252*a* and 252*b* forms a cup-shaped shell having a recess 267 (FIGS. 7A–7D). Preferably, a padded cushion 271, such as the one described in U.S. Pat. No. 4,856,118 entitled "Headphone Cushioning," which is incorporated herein by reference, is positioned at the mouth of each device 252*a* and 252*b* as shown by FIGS. 7A–7D so that the noise reduction devices 252*a* and 252*b* comfortably engage the spectator's head during use. When device 252*a* or 252*b* is engaged with the spectator's head, the spectator's ear fits into the recess 267, and the engaged device 252*a* or 252*b* blocks external noises from reaching the ear. Therefore, devices 252*a* and 252*b* are similar to the earcup described in U.S. Pat. No. 5,023,955, entitled "Impact-Absorbing Sound-Attenuating Earcup," filed on Apr. 13, 1989, by Murphy, II et al., which is incorporated herein by reference.

Similar to U.S. Pat. No. 5,018,599, entitled "Headphone Device," and filed on Sep. 18, 1989, by Masahiro et al., which is incorporated herein by reference, each noise reduction device 252*a* and 252*b* is respectively coupled to and houses speakers 103*a* and 103*b*. The speakers 103*a* and 103*b* are respectively coupled to cables 191*a* and 191*b*, and produce sound corresponding to the audio signals transmitted via cables 191*a* and 191*b*. Consequently, in use, external noises are attenuated, yet the spectator can clearly hear the selected audio signals produced by the speakers 103*a* and 103*b*.

Device 252*a* will be described in more detail hereafter. However, it should be apparent to one skilled in the art that device 252*b* includes the same features of device 252*a* except that device 252*b* is coupled to temple piece 259*b* (instead of piece 259*a*) and is designed to cover the spectator's opposite ear.

Figure 7A:
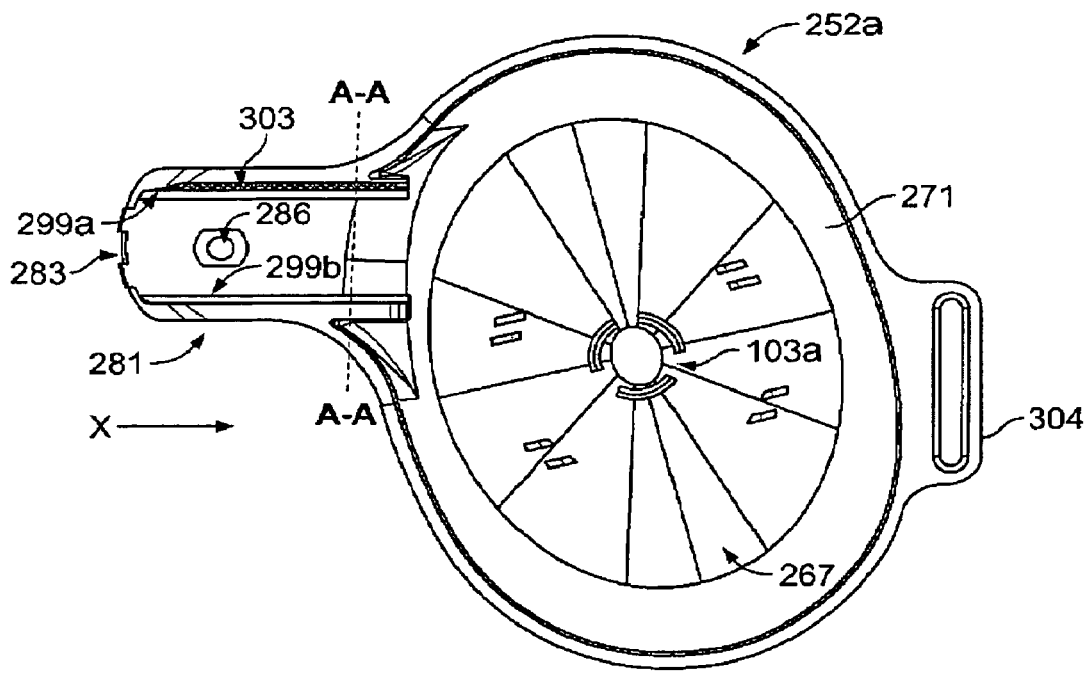
FIG. 7A is a side view of the noise reduction device of the head mounted display depicted in FIG. 6.
Figure 7B:
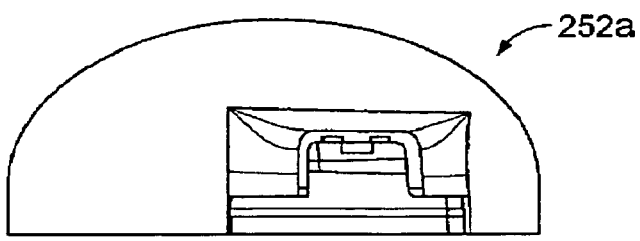
FIG. 7B is a front view of the noise reduction device of the head mounted display depicted in FIG. 6.
Figure 7C:
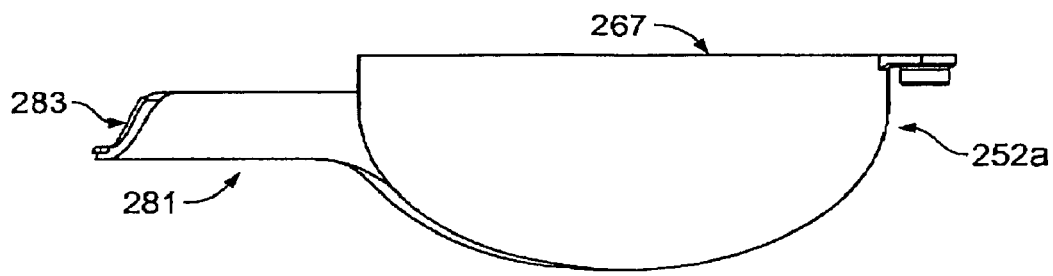
FIG. 7C is a bottom view of the noise reduction device of the head mounted display depicted in FIG. 6.
Figure 8A:
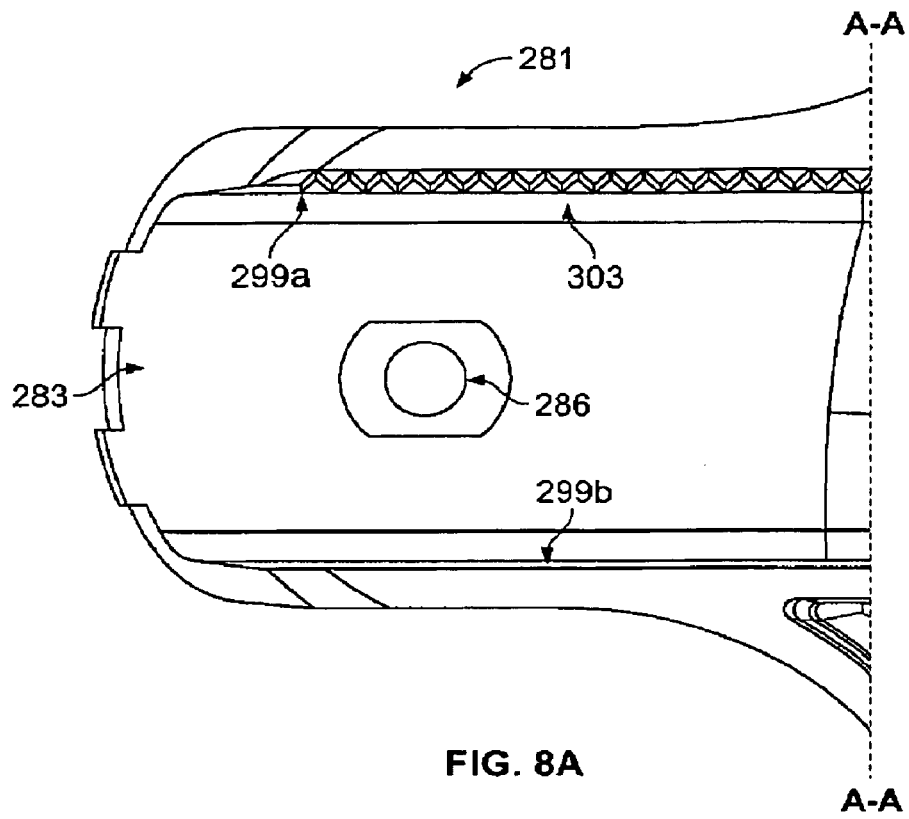
FIG. 8 is a more detailed view of the left temple piece of the head mounted display depicted in FIG. 6.
Figure 8B:
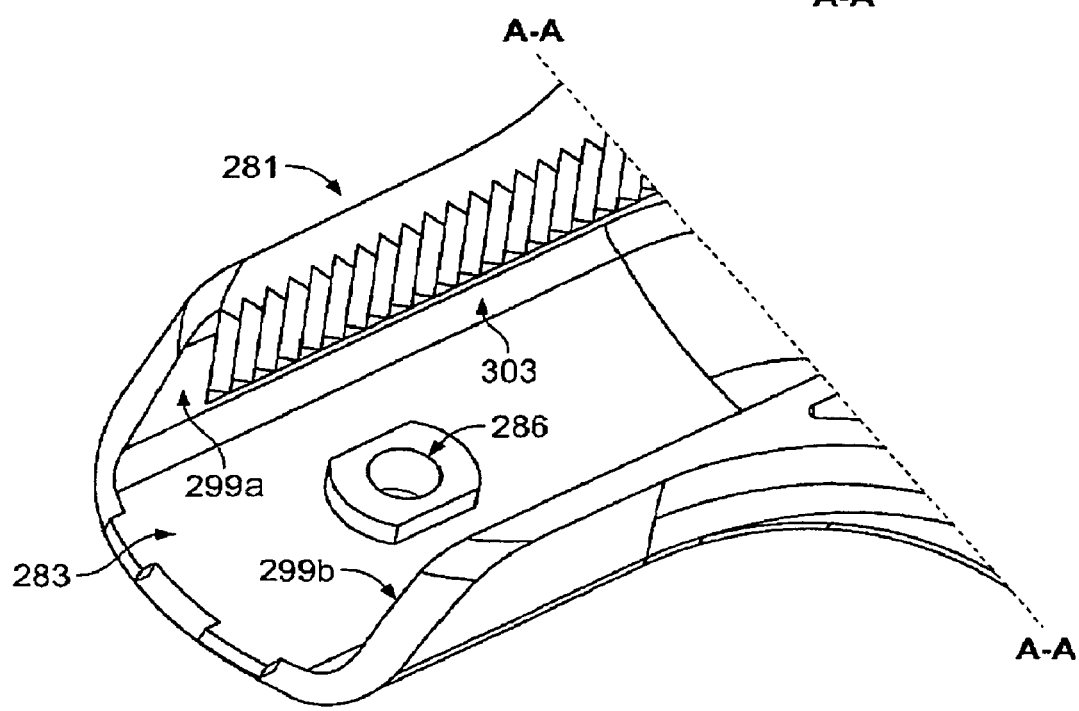

Referring to FIGS. 7A, 8A, and 8B, the device 252*a* preferably includes a member 281 having a slot 283 adapted to receive temple piece 259*a*. The member 281 also includes a hole 286. In operation, the temple piece 259*a* passes through slot 283, and a securing member 288 (FIG. 9), such as a bolt or a screw for example, passes through the hole 286 and passes through a slot 264 (FIG. 9) in the temple piece 259*a*. The securing member 288 is preferably secured to the temple piece 259*a* and the member 281 via any suitable technique. For example, the securing member 288 may be screwed through the member 281 via hole 286, and the securing member 288 may also be screwed through a piece 291 (FIG. 9) located on a side of the temple piece 259*a* opposite of the member 281. Therefore, the member 281 is secured to the temple piece 259*a* via the securing member 288. However, it should be apparent to one skilled in the art that other devices and methodologies may be employed to secure the member 281 to temple piece 259*a*.

Figure 9:
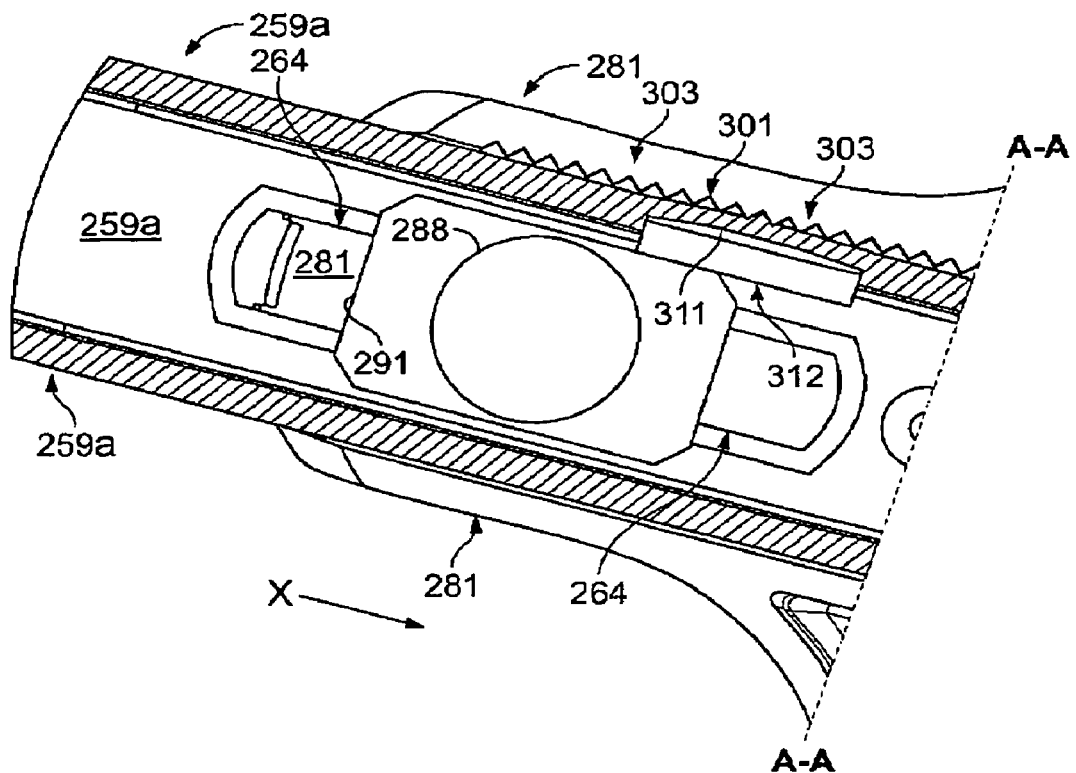
FIG. 9 is a top view of a temple piece of the head mounted display depicted in FIG. 6.
Figure 10:
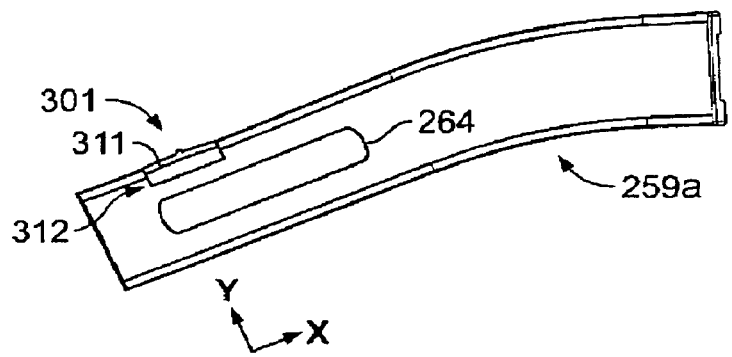
FIG. 10 is a side view of a temple piece of the head mounted display depicted in FIG. 6.

As shown by FIG. 10, a ridge 301 is formed on a side of the temple piece 259*a* that engages a wall 299 (FIG. 7A) of slot 283, when the temple piece 259*a* is received by slot 283. As shown by FIG. 7A, a portion of the wall 299 of slot 283 includes a series of notches 303 that are each capable of receiving the ridge 301. When the ridge 301 is received by a notch 303, as shown by FIG. 9, any force tending to move the device 252*a* relative to the temple piece 259*a* in the x-direction causes the ridge 301 to press against a portion of the wall 299 forming the notch 303, until the device 252*a* is pushed with a force sufficient to deform a flexible portion 311 of temple piece 259*a*. The flexible portion 311 is positioned adjacent to slot 312 to allow the flexible portion 311 to deform away from the surface 299. Once this occurs, the ridge 301 moves past the notch 303 more easily, allowing the temple piece 259a to move relative to member 281 and, therefore, device 252a. The flexible portion 311 preferably has sufficient elasticity to return to its undeformed state once the ridge 301 moves past the notch 303. Therefore, after moving past the aforementioned notch 303, the ridge 301 should engage a portion of the wall 299 forming another notch 303.

Therefore, the user can slide the device 252a in the x-direction along the length of the temple piece 259a causing the ridge 301 to be received by different notches 303 until the device 252a is properly positioned relative to the spectator's head (i.e., until the spectator's ear is comfortably positioned within the recess 267 of the device 252a). Once the spectator stops sliding the device 252a and the ridge 301 is received by one of the notches 303, the position of the device 252a relative to the temple piece 259a and, therefore, the spectator's head should remain constant until a force sufficient for deforming the flexible portion is exerted on the HMD 250.

As shown by FIG. 6, the device 252a is preferably fastened to an end of the strap 156. Therefore, each end of the strap 156 is coupled to each of the noise reduction devices 252a and 252b. To fasten the devices 252a and 252b to the strap 156, each device 252a and 252b may include a clip, clasp, loop, ring 304 or other type of fastening device. The length of the strap 156 can be adjusted via conventional techniques to adjust the size of the HMD 250. Therefore, to don the HMD 250, a user places the forehead brace 161 (FIG. 6) against his forehead and positions the strap 156 around the back of his head. The spectator then tightens the strap 156 (i.e., reduces the length of the strap 156) until the HMD 250 is comfortably held in place. The spectator adjusts the position of the devices 252a and 252b by respectively sliding the devices 252a and 252b along the length of the temple piece 259a and 259b in the x-direction until the devices 252a and 252b are properly positioned. Then, the spectator can further tighten the strap 156 as desired to further press the forehead brace 161 and the devices 252a and 252b against the spectator's head.

In this regard, tightening the strap 156 reduces the circumference of the HMD 250 thereby pressing each device 252a and 252b and the forehead brace 161 further against the spectator's head. To a certain degree, as the strap 156 is tightened, external noise is better attenuated, and it is less likely that the HMD 250 will move with respect to the spectator's head. Accordingly, the spectator can tighten or loosen the strap 156 as desired until the desired fit and desired noise reduction is achieved.

It should be noted that it is possible to swap the position of ridge 301 with notches 303. In other words, it is possible to form ridge 301 on a flexible portion of device 252a and to form the grooves 303 in the temple piece 259a without materially affecting the performance or operation of the HMD 250.

Operation

The preferred use and operation of the video/audio system 20 and associated methodology are described hereafter.

Assume for illustrative purposes that a spectator would like to attend an auto race and would like to have access to an in-car view from a camera within his favorite driver's car. In addition, the spectator would also like to continuously hear the dialogue between the aforementioned driver and the driver's pit crew, as well as the comments provided by his favorite radio commentator. It should be apparent that other views and/or sounds may be desirable in other examples.

In the past, the spectator would attend the race and acquire (as well as tune) a radio to receive the commentator's comments and a radio to receive the radio signals transmitted between the driver and the driver's pit crew. Then, the spectator would locate a monitor at the stadium displaying the in-car view that he desires to see, assuming that such a monitor is provided. The spectator would then remain within sight of the monitor and listen to the two radios. If the monitor is not located in a desirable location for viewing the race, the spectator would have to choose between viewing the monitor and viewing the race at a desirable location. Furthermore, the handling of multiple radios is generally cumbersome and distracting.

However, in accordance with the present invention, the user attends the race and is provided a receiver 75 for his individual use. In the preferred embodiment, the receiver 75 is located at the spectator's seat within the stadium. However, the receiver 75 may be located at other convenient locations, and when the combined signal 71 is transmitted via a wireless transmitter, the spectator may carry the receiver 75 around with him to any desirable location in or around the stadium.

The receiver preferably includes the HMD 250 depicted by FIG. 6. Therefore, the spectator dons the HMD 250 such that the forehead brace 161 is pressed against his forehead and each noise reduction device 252a and 252b covers one of the spectator's ear. Then, the spectator adjusts the length of the strap 156 until the HMD 250 properly fits about his head. The spectator then manipulates buttons or other types of switches at user interface 94 to control which signal 84 is output by multiplexer 88 and, therefore, which signals 22 and 25 are transmitted via cable 171 to the HMD 250. Through techniques known in the art, images defined by the video signals transmitted along cable 171 are shown by display device 101 (e.g., LCDs 175), and sounds defined by the audio signals transmitted along cable 171 are produced by speakers 103a and 103b, which are respectively located within devices 252a and 252b. Accordingly, the spectator may use the receiver 75 to see the desired view of the race (i.e., the in-car view) and to hear the desired sounds of the race (i.e., the dialogue between the driver and the driver's pit crew, and the comments from the radio commentator).

In this regard, the interface device 28 preferably receives at least a video signal 22 defining the in-car view of his favorite driver and a plurality of audio signals 25 defining the dialogue between his favorite driver and the driver's pit crew, as well as the comments from his favorite radio commentator. At least one of the audio combiners 52 combines these audio signals 25 into a combined signal 55. One of the signal modulators 61 receives this combined signal 55 and the video signal 22 defining the desired in-car view. This video signal 22 is modulated and combined with the foregoing combined signal 55 by one of the signal modulators 61 to create a modulated signal 64. This modulated signal 64 is combined with other modulated signals 64 and transmitted to the spectator's receiver 75 via combiner 67.

The demodulator 82 in the spectator's receiver 75 demodulates and separates the received signal 71 into separate signals 84. Based on the control signals 92 received from user interface 94, the multiplexer 88 allows only the signal 84 defined by the aforementioned video and audio signals 22 and 25 to pass. Therefore, these video and audio signals 22 and 25 are respectively transmitted to the display device 101 and speakers 103a and 103b and the spectator may enjoy the view and sounds that he selected.

It should be noted that it is not necessary for the spectator to keep the receiver 75 within the stadium. In this regard, the signal 71 may be transmitted via satellites and/or communication networks to various locations around the world, and the spectator may select the view and sounds he prefers the most from just about any location capable of receiving signal 71.

It should also be noted that the receiver 75 may be retrieved from the spectator after the spectator is finished viewing the event so that the receiver can be provided to another spectator for another event at the stadium. Each spectator is preferably charged a usage fee for the spectator's use of the receiver 75. It should be noted that a portion of the receiver 75 may be installed at the spectator's seat such that user only needs to retrieve the HMD 151 and/or other components of the receiver 75 during the event and return the retrieved components after the event. Furthermore, the entire receiver 75 may be installed at the spectator's seat such that spectator only needs to pay for the use of the receiver.

In addition, it may be desirable for one of the audio signals 25 to have a higher amplitude than the other audio signals 25. For example, a spectator may desire to hear comments from a radio commentator unless a communication between his favorite driver and the driver's pit crew occurs. When the a communication between the driver and the driver's crew occurs, the spectator would rather listen to this communication instead of the radio commentator's comments.

Accordingly, one of the audio combiners 25 is preferably used to combine a first audio signal 25 defining the radio commentator's comments and a second audio signal defining the communications between the driver and the driver's pit crew preferably increases the amplitude of the second audio signal 25 relative to the first audio signal. This may be accomplished by increasing the amplitude of the second audio signal 25 with an amplifier or by attenuating the amplitude of the first audio signal 25 with an attenuator. Therefore, when the combined signal 55 produced by the aforementioned audio combiner 52 is ultimately received by the spectator's receiver 75, which produces sound based on this combined signal 55, the user hears the radio commentator's comments when there is no communication between the driver and the driver's crew. However, when there is a communication between the driver and the driver's crew, this communication is louder than the radio commentator's comments. Accordingly, the spectator can clearly hear the communications between the driver and the driver's crew even though the spectator's ability to clearly hear the radio commentator's comments is impaired. It should be noted that the foregoing techniques for increasing the amplitude of one audio signal 25 relative to others may be employed for different combinations of audio signals 25 and is not limited to the exemplary combination described above.

Furthermore, it should also be noted that the present invention has been described herein in the context of auto racing. However, the system 20 may be useful in other applications as well. The system 20 would be useful in any application where it is desirable for the user to control the types of views and sounds of an event that are presented to the user. For example, the present invention could be particularly useful in any type of sporting event or other type of event attended by a large number of people.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

The invention claimed is:

1. A portable audio/visual device to be used at a sporting event by a user while watching the sporting event live, the portable audio/visual device comprising:
   a receiver receiving a plurality of image signals associated with the sporting event and a plurality of audio signals associated with the sporting event, said receiver being configured to wirelessly receive said image and audio signals from a transmitter;
   an user interface communicating with said receiver for selecting at least one of said image signals and at least one of said audio signals based on an input from a user to produce selected audio and image signals, wherein said selected image signal defines an image produced by a camera positioned at the sporting event;
   a display communicating with said receiver, said display receiving said selected image signal and producing a visual image based on said selected image signal;
   first and second noise reduction devices configured to be placed over the ears of a user; and
   a first speaker provided in said first noise reduction device, said first speaker producing sounds based on said selected audio signal;
   wherein said receiver is configured to receive said audio and image signals while at a stadium and where the sporting event is occurring, thereby permitting the user to carry said portable audio/visual device about the stadium and choose where to view said selected image signal and listen to said selected audio signal while roaming at the stadium during the sporting event.

2. The device of claim 1, further comprising at least one of a strap and a head mount coupled to said first and second noise reduction devices to retain said first and second noise reduction devices on the head of the user.

3. The system of claim 1, wherein the sporting event is an auto race and said selected image signal defines an image produced by a camera positioned within a vehicle participating in the auto race.

4. The device of claim 1, wherein the sporting event is an auto race and said selected audio signal defines a communication by a driver of a vehicle in the auto race.

5. The device of claims 1, wherein at least one of said selected audio and image signals are modulated, further comprising a demodulator demodulating at least one modulated selected audio and image signal.

6. The device of claim 1, wherein said receiver receives a combined audio and image signal from the transmitter.

7. The device of claim 1, wherein said receiver, user interface and display are commonly housed in a portable hand-held unit.

8. The device of claim 1, wherein said first and second noise reduction devices cover the users ears to reduce an amount of external noise heard by the user.

9. The device of claim 1, further comprising a head mount, said head mount and said first and second noise reduction devices having ridges and notches joining one another to selectively resist movement of said first and second noise reduction devices with respect to said head mount.

10. The device of claim 1, wherein the sporting event is an auto race and at least a portion of said plurality of audio signals define different sounds associated with the auto race.

11. The device of claim 1, wherein the sporting event is an auto race and at least one of said audio signals defines at least one of noise from vehicles participating in the auto race, comments of commentators and comments between a driver and the driver's pit crew.

12. The device of claim 1, wherein the sporting event is an auto race and at least a portion of said plurality of image signals define video images of the auto race.

13. The device of claim 1, wherein said receiver includes a demodulator configured to demodulate and separate said image signals based on frequency.

14. The device of claim 1, wherein said receiver includes a multiplexer configured to select one of said image signals based on the input from the user.

15. The device of claim 1, wherein said first and second noise reduction devices are mounted on a head mounted apparatus.

16. The device of claim 1, wherein said display is head mounted.

17. The device of claim 1, wherein said image signals are separately transmitted to said receiver.

18. The device of claim 1, wherein said audio signals are separately transmitted to said receiver.

19. The device of claim 1, wherein said receiver includes a filter configured to output said selected image signal.

20. The device of claim 1, wherein said receiver includes a filter configured to output said selected audio signal.

21. The device of claim 1, wherein the selected image signal is a video image signal.

22. An audio/visual system for providing select combinations of audio and image signals, the system to be used at a sporting event by a user while watching the sporting event live, the system comprising:
an interface device receiving a plurality of image signals and a plurality of audio signals associated with a sporting event, said interface device wirelessly transmitting said audio and image signals, wherein at least one of said image signals defines an image produced by a camera positioned at the sporting event;
a receiver to be carried by the user while at the sporting event, the receiver wirelessly receiving said audio and image signals the interface device, wherein the receiver is a portable unit and further comprises:
an user interface communicating with said receiver for selecting at least one of said image signals and at least one of said audio signals to produce selected audio and image signals, wherein the selection is based on an input from an user;
a display communicating with said receiver, said display receiving said selected image signal and producing a visual image defined by said selected image signal;
first and second noise reduction devices configured to be placed over the ears of a user; and
a first speaker coupled to said first noise reduction device, said first speaker producing sounds defined by said selected audio signal;
wherein said receiver configured to receive said audio and image signals while at a stadium and where the sporting event is occurring, thereby permitting the user to carry said receiver about the stadium and choose where to view said selected image signal and listen to said selected audio signal while roaming about the stadium the sporting event.

23. The system of claim 22, wherein the receiver further comprises at least one of a strap and a head mount coupled to said first and second noise reduction devices to retain said first and second noise reduction devices on the head of the user.

24. The system of claim 22, wherein the receiver further comprises a second speaker coupled to said second noise reduction device and configured to produce sounds defined by said selected audio signal.

25. The system of claim 22, wherein the sporting event is an auto race and said selected image signal defines at least one image produced by a camera positioned within a vehicle participating in the auto race.

26. The system of claim 22, wherein the sporting event is auto race and said selected audio signal defines a communication by a driver of a vehicle in the auto race.

27. The system of claim 22, wherein the receiver further comprises a head mount, said first noise reduction device includes a first slot adapted to receive said head mount, said first slot defined by a wall of said first noise reduction device, said wall of said first noise reduction device including a series of first notches, said head mount having a first ridge that is sequentially received by said first notches as said head mount passes through said first slot.

28. The system of claim 22, wherein said receiver, user interface and display are commonly housed in a portable hand-held unit.

29. The system of claim 22, wherein said first and second noise reduction devices cover the users ears to reduce an amount of external noise heard by the user.

30. The system of claim 22, further comprising a head mount, said head mount and said first and second noise reduction devices having ridges and notches joining one another to resist movement of said first and second noise reduction devices with respect to said head mount.

31. The system of claim 22, wherein the sporting event is an auto race and at least a portion of said plurality of audio signals define different sounds associated with the auto race.

32. The system of claim 22, wherein the sporting event is an auto race and at least one of said audio signals defines at least one of noise from vehicles participating in the race, comments of commentators and comments between a driver and the driver's pit crew.

33. The system of claim 22, wherein the sporting event is an auto race and at least a portion of said plurality of image signals define video images of the auto race.

34. The system of claim 22, wherein said receiver includes a demodulator configured to demodulate and separate said image signals based on frequency.

35. The system of claim 22, wherein said receiver includes a multiplexer configured to select one of said image signals based on the input from the user.

36. The system of claim 22, wherein and said first and second noise reduction devices are mounted on a head mounted apparatus.

37. The system of claim 22, wherein said display is head mounted.

38. The system of claim 22, wherein said image signals are separately transmitted to said receiver.

39. The system of claim 22, wherein said audio signals are separately transmitted to said receiver.

40. The system of claim 22, wherein said receiver includes a filter configured to output said selected image signal.

41. The system of claim 22, wherein said receiver includes a filter configured to output said selected audio signal.

42. The system of claim 22, wherein at least one of the image signals constitutes a dedicated individual camera view from a single camera located at the sporting event, said user interface selecting the image signal from the single camera and the display displaying the dedicated individual camera view continuously and uninterrupted until the user selects another one of the image signals.

43. The system of claim 22, wherein each of the plurality of image signals constitute dedicated individual camera views from separate cameras located about the sporting event, said user interface selecting one of the cameras and the display displaying the corresponding dedicated individual camera view continuously and uninterrupted until the user selects another one of the individual camera views.

44. The system of claim 22, wherein the selected image signal displayed corresponds to an individual camera view from a single camera that is not controlled or selected by a television crew.

45. The system of claim 22, wherein at least one of the image signals selected by the user is not a television network signal.

46. The system of claim 22, wherein one of the image signals selected by the user correspond to a television network signal and at least one of the image signals selected by the user does not correspond to a television network signal.

47. The system of claim 22, wherein said user interface allows the user to control and switch between the image signals separately and independent of television network signals.

48. The system of claim 22, wherein the selected image signal is a video image signal.

* * * * *